(12) United States Patent
Parks

(10) Patent No.: US 12,201,098 B2
(45) Date of Patent: Jan. 21, 2025

(54) EXPANDABLE BAIT KEEPER FOR SOFT FISHING LURES

(71) Applicant: Steve Parks, Burleson, TX (US)

(72) Inventor: Steve Parks, Burleson, TX (US)

( * ) Notice: Subject to any disclaimer, the term of this patent is extended or adjusted under 35 U.S.C. 154(b) by 0 days.

(21) Appl. No.: 16/204,422

(22) Filed: Nov. 29, 2018

(65) Prior Publication Data

US 2020/0170230 A1    Jun. 4, 2020

(51) Int. Cl.
*A01K 83/06* (2006.01)
*A01K 85/02* (2006.01)

(52) U.S. Cl.
CPC .............. *A01K 83/06* (2013.01); *A01K 85/02* (2013.01)

(58) Field of Classification Search
CPC ........ A01K 86/06; A01K 93/00; A01K 83/00; A01K 83/06
USPC ...................... 43/44.2, 44.8, 43.16
See application file for complete search history.

(56) References Cited

U.S. PATENT DOCUMENTS

| | | | | |
|---|---|---|---|---|
| 626,777 A * | 6/1899 | Slotterbeck | ............ | A01K 83/00 43/42.7 |
| 637,169 A * | 11/1899 | Slotterbeck | ............ | A01K 83/00 43/42.7 |
| 700,093 A * | 5/1902 | Seiler | ...................... | A01K 83/00 43/42.7 |
| 885,642 A * | 4/1908 | OSterhout | .............. | A01K 83/06 43/42.36 |
| 1,014,516 A * | 1/1912 | Rains | ..................... | A01K 83/04 43/37 |
| 1,957,799 A * | 5/1934 | Peterson | ................ | A01K 85/10 43/53.5 |
| 2,241,152 A * | 5/1941 | Moats | ..................... | A01K 83/06 43/44.2 |
| 2,311,832 A * | 2/1943 | Helfenstein | ............ | A01K 83/06 43/36 |
| 2,541,847 A * | 2/1951 | Bradley | ................. | A01K 83/06 43/41 |
| 2,648,927 A * | 8/1953 | Berry | ..................... | A01K 83/04 43/37 |
| 2,668,387 A * | 2/1954 | Gallardo | ................ | A01K 83/06 43/44.4 |
| 3,890,735 A * | 6/1975 | Serrill | ..................... | A01K 83/02 43/36 |
| 3,942,282 A * | 3/1976 | Flagel | .................... | A01K 83/06 43/44.2 |

(Continued)

*Primary Examiner* — Morgan T Jordan
(74) *Attorney, Agent, or Firm* — Brian K. Yost; Decker Jones, PC

(57) ABSTRACT

A fishing tackle bait keeper for a fishing hook includes an anchor and an extension member. The anchor has a sleeve with first and second ends, and plural ribs coupled to the first end. The ribs project in a diverging arrangement from the first end of the sleeve in a direction opposite of the sleeve first end. The ribs each have a free end. The ribs move from a deployed position to a retracted position, wherein when the ribs are in the retracted position, the ribs are oriented with the sleeve to allow insertion of the bait keeper into a bait, and wherein when the ribs are in the deployed position, the ribs extend out from the sleeve to resist being removed from the bait, the ribs are normally in the deployed position. The extension member is coupled to the sleeve and having an attachment portion for coupling with the hook.

13 Claims, 3 Drawing Sheets

(56) References Cited

U.S. PATENT DOCUMENTS

| | | | | |
|---|---|---|---|---|
| 4,233,771 A | * | 11/1980 | Robinson | A01K 83/06 43/41 |
| 4,334,381 A | | 6/1982 | Carver | |
| 4,796,378 A | * | 1/1989 | Krueger | A01K 83/00 43/42.38 |
| 4,850,132 A | * | 7/1989 | Motyka | A01K 83/06 43/44.2 |
| 4,873,781 A | * | 10/1989 | Bates | A01K 85/02 43/35 |
| 5,138,790 A | * | 8/1992 | McManus | A01K 91/04 43/43.16 |
| 5,218,780 A | * | 6/1993 | Jacobson | A01K 83/06 43/44.4 |
| 5,220,743 A | * | 6/1993 | McClellan | A01K 85/00 43/42.38 |
| 5,491,925 A | * | 2/1996 | Carpenter | A01K 83/02 43/35 |
| 5,630,289 A | * | 5/1997 | Dotson | A01K 85/00 43/44.8 |
| 5,784,827 A | * | 7/1998 | Jimenez, Jr. | A01K 85/00 43/44.8 |
| 5,904,001 A | * | 5/1999 | Rabideau | A01K 85/00 43/44.8 |
| 5,946,846 A | * | 9/1999 | Cotton | A01K 83/02 43/36 |
| 6,240,672 B1 | * | 6/2001 | Huppert | A01K 85/00 43/44.8 |
| 7,735,257 B1 | * | 6/2010 | Firmin | A01K 83/06 43/44.8 |
| 7,841,127 B1 | * | 11/2010 | Nakamichi | A01K 85/00 43/44.8 |
| 7,861,455 B2 | * | 1/2011 | Ciotlos | A01K 85/00 43/42.3 |
| 8,910,414 B2 | * | 12/2014 | Finley | A01K 83/06 43/34 |
| 9,288,970 B1 | * | 3/2016 | Washington | A01K 83/06 |
| 2002/0073605 A1 | * | 6/2002 | Brinkman | A01K 83/06 43/42.02 |
| 2005/0055867 A1 | * | 3/2005 | Mendoza | A01K 83/04 43/44.82 |
| 2007/0062096 A1 | * | 3/2007 | Roos | A01K 85/00 43/37 |
| 2007/0089352 A1 | * | 4/2007 | Hergott | A01K 85/00 43/42.11 |
| 2012/0023804 A1 | | 2/2012 | Hogan | |
| 2014/0041279 A1 | * | 2/2014 | Dalton | A01K 83/06 43/4.5 |
| 2014/0237888 A1 | * | 8/2014 | Rapelje | A01K 85/14 43/4.5 |
| 2017/0027144 A1 | * | 2/2017 | Wilson | A01K 85/16 |
| 2017/0339932 A1 | * | 11/2017 | Curcio | A01K 85/005 |
| 2018/0177170 A1 | * | 6/2018 | Tucker | A01K 83/06 |
| 2019/0174732 A1 | * | 6/2019 | Mahaffey | A01K 83/06 |
| 2019/0216065 A1 | * | 7/2019 | Peichl | A01K 83/06 |
| 2019/0307109 A1 | * | 10/2019 | Dano | A01K 83/06 |

* cited by examiner

EXPANDABLE BAIT KEEPER FOR SOFT FISHING LURES

FIELD OF THE INVENTION

The present invention relates to fishing lures, and in particular to bait or lure keepers or holders.

BACKGROUND OF THE INVENTION

A common method of fishing involves the use of artificial lures or baits. Fishing with artificial lures is convenient and productive for the angler. Live bait must be kept alive and replenished frequently from a bait shop or other source. Artificial lures do not require the same care. Many artificial lures are attractive to fish when fished with skill and are productive in catching fish.

One type of artificial lure is made of soft plastic. Soft plastic lures are available in a wide variety of sizes and shapes, such as a worm, a crawfish, a toad, a grub, etc. Typically, soft plastic lures are sold unrigged with hooks. This allows the angler to select the particular hook, such as type and size, to better match the species of fish being sought.

In rigging a hook with a soft plastic lure, the hook can be tied to fishing line, or the hook can be part of additional fishing tackle, such as a jig head. In a jig head, a heavy head has an eye for tying to fishing line, and a hook shank extending in a direction opposite to the eye.

The hook is inserted into the soft plastic lure, typically along a body of the lure. The shank of the hook can be embedded in the plastic, or the shank can extend outside of the plastic. The point of the hook can be free, or in a weedless configuration, the hook point can be located in the lure to avoid snagging on weeds and aquatic vegetation.

When the lure is cast and retrieved, a fish will typically strike the lure from behind, which is on the end opposite of the fishing line. A fish strike will pull the lure along the hook shank. Such a lure is misshapen. Anglers use lures according to their shape and movement through the water. Such movement is imparted to the lure during retrieve, or as the lure falls in the water column. A moving lure provides action, which action provokes a fish strike. After a lure is misshapen, the action is adversely affected and the angler must reconfigure the lure.

To avoid the lure from being pulled along the hook, bait or lure keepers, or holders, are used. A bait keeper is located at or near the front end of the hook, where the line is tied. The front end of the lure is attached to the bait keeper. Thus, the front end of the lure is now anchored in place along the hook. Any fish strikes will not result in the front end of the lure from being pulled back. The shape of the lure, and its action through the water, is thus preserved.

There are several types of bait keepers available in the prior art. One common type is a helical spring, or screw lock, as illustrated in Hogan, U.S. Patent Application No. 20120023804. A screw lock bait keeper requires the angler to twist the lure onto the helical spring, an activity which takes time. If fish are biting, and an angler is forced to replace a damaged lure, speed in rerigging is highly desired.

Another type of bait keeper is a stiff shaft with barbs, as illustrated in Huppert, U.S. Pat. No. 6,240,672. A variation of the barbed shaft is illustrated in Carver U.S. Pat. No. 4,334,381. These bait keepers do not hold the soft plastic securely. After a few casts and retrieves, a lure may work itself free of the bait keeper, requiring the angler to straighten the lure and defeat the purpose of the bait keeper.

Thus, it is desired to provide a bait keeper that is fast to rig and holds the bait securely.

DESCRIPTION OF THE PREFERRED EMBODIMENT

Figure 5:
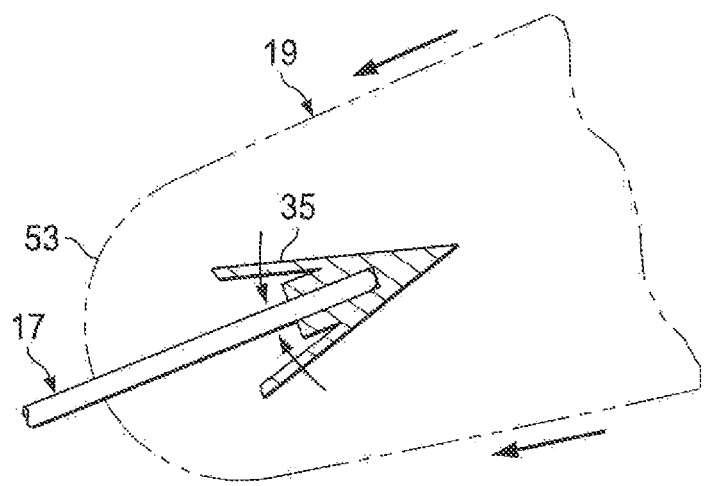
FIG. 5 shows a detail view of the bait keeper, with the soft fishing lure being installed and pushed onto the bait keeper, showing the bait keeper in a retracted mode.
Figure 6:
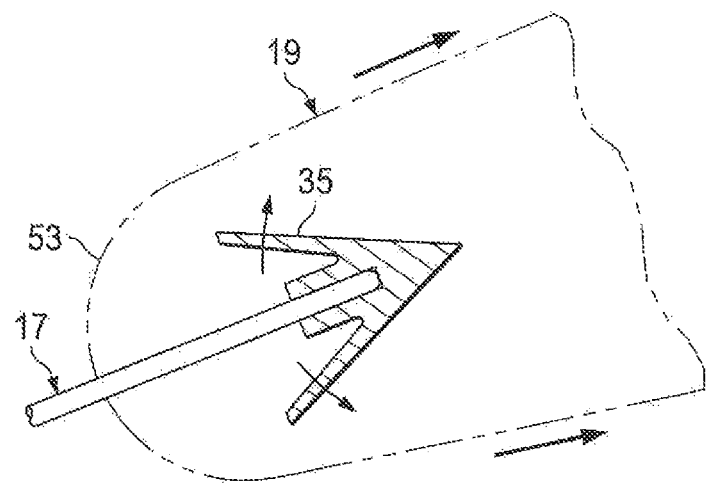
FIG. 6 shows a detail view of the hook and bait keeper, with the soft fishing lure being pulled back slightly, showing the bait keeper in an expanded mode.
Figure 7:
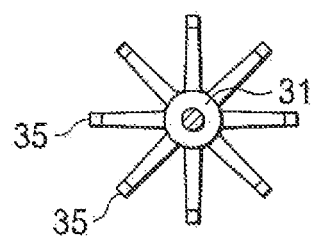
FIG. 7 shows a top view of the anchor, shown with the extension member in transverse cross-section.

The present invention provides a bait, or lure, keeper, which together with other fishing tackle, forms a castable lure. An example of a castable fishing lure 11 is shown in FIG. 5. The castable lure 11 includes a hook 15, the bait keeper 17, and a lure 19.

Figure 1:
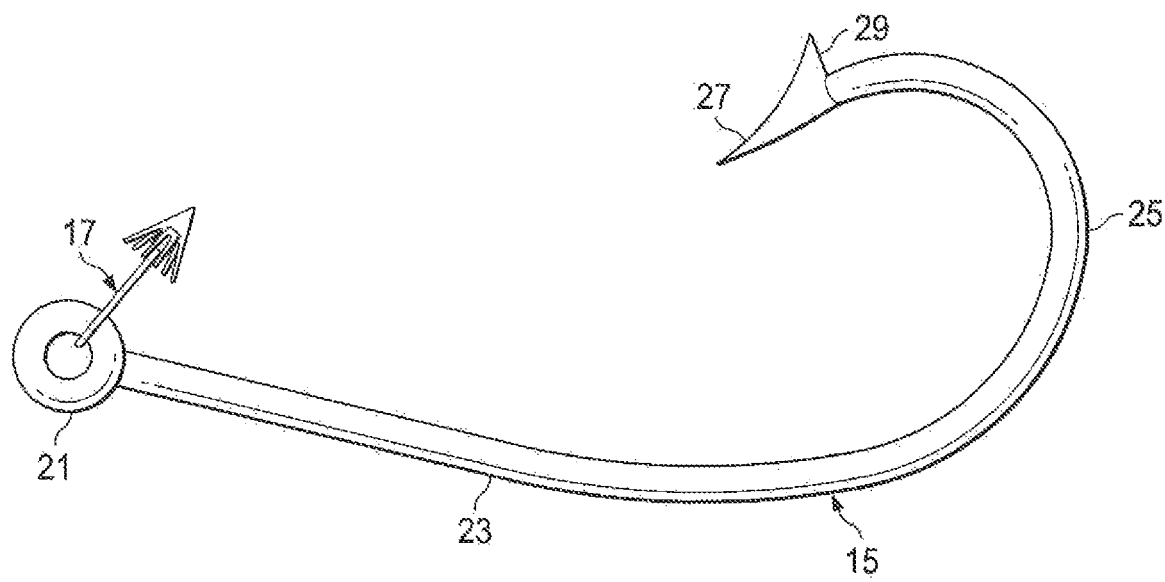
FIG. 1 is a side view of a fishing hook with the expandable bait keeper of the present invention, in accordance with a preferred embodiment.

The hook 15 has an eye 21, a shank 23, a bend 25 and a point 27. Near the point is a barb 29. The shank 23 and the bend 25 lie in a plane. For most hooks, the point 27 will lie in the same plane. Fishing line is tied to the eye 21. Hooks 15 come in a variety of styles. The hook shown in FIG. 1 is an offset hook. Other types of hooks, such as EWG (with an offset shank), straight shank, circle hook, etc., can be used. Also, the hook can be a stand-alone hook, or combined with other tackle, such as a jig head, a spinner, etc. In a jig head, a mass (typically ball shaped) of metal has the hook shank protruding therefrom in one direction and the eye protruding in another direction.

Figure 2:
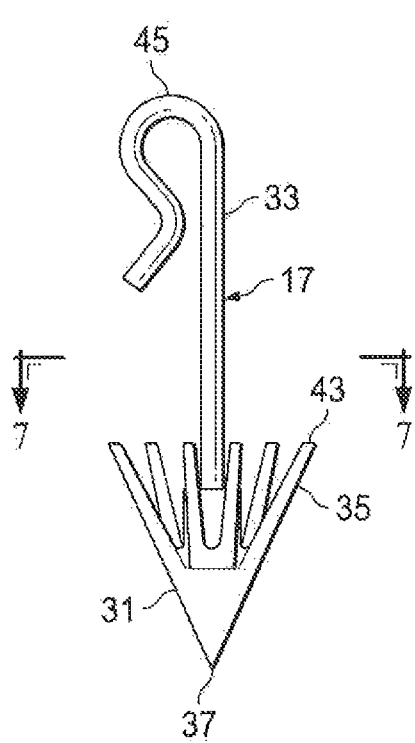
FIG. 2 is a side view of the bait keeper of FIG. 1.
Figure 3:
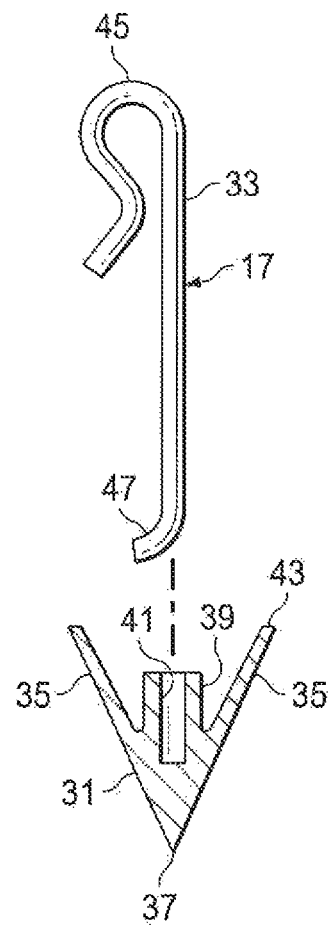
FIG. 3 is an exploded side view of the bait keeper of FIG. 2, with the anchor in cross-section.

The bait keeper 17, shown in FIGS. 2 and 3, has an anchor 31 and an extension member 33. The anchor 31 has plural ribs 35 extending from a tip 37 in a back-swept manner. The anchor also has a sleeve 39 located inside the ribs. The sleeve is open at one end and closed at the opposite, or tip 37, end. A cavity 41 is formed inside the sleeve.

In the preferred embodiment, the tip 37 is pointed so as to have a reduced outside diameter than the sleeve. The tip need not be pointed, and can be blunt. However, a pointed tip is easier to insert into a lure than a blunt tip.

The anchor 31 has plural ribs 35 arranged equidistant around the circumference of the sleeve 39. In the preferred embodiment, there are 8-12 ribs. For example, with 10 ribs, the ribs are spaced about 36 degrees apart from each other, to provide equal spacing around the circumference of the sleeve. Each rib 35 is thinner than the sleeve 39. Each rib extends for some distance from the tip so as to provide a desired radial spread. The ribs are joined together at the tip portion. Each rib 35 extends from the tip portion to a free end 43.

Figure 4:
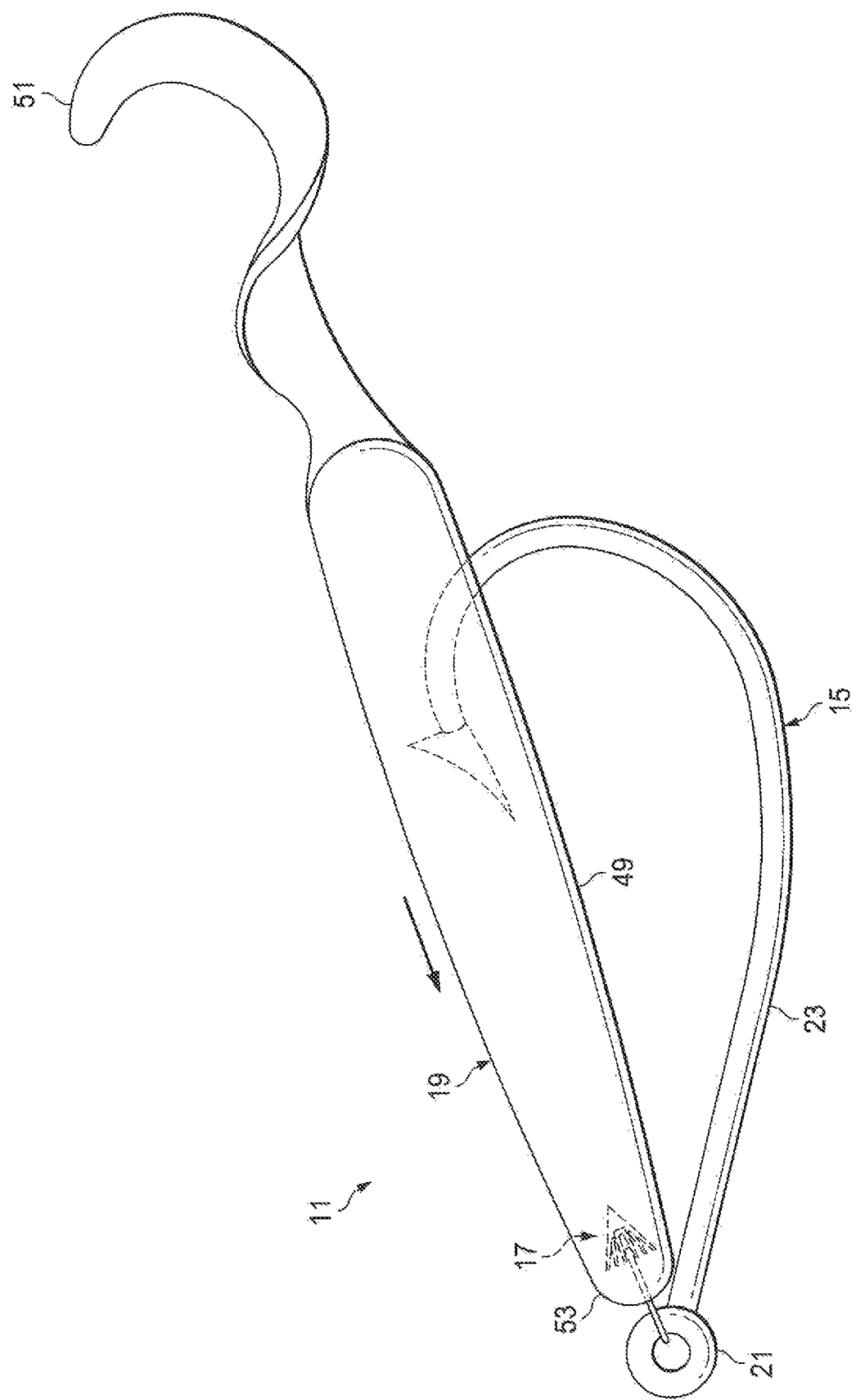
FIG. 4 shows the hook and bait keeper, with a soft fishing lure installed onto the bait keeper and the hook.

The anchor 31 is molded in one piece out of thermoplastic. Thus, the sleeve 39 and ribs 35 are integral. The ribs are flexible in that the ribs can move radially inward, and return to the radial out position. The ribs 35 thus can be moved from a deployed position to a retracted position. In the deployed position, shown in FIGS. 2, 3 and 5, the free ends 43 of the ribs are extended a first radial distance from the sleeve. The ribs are generally straight, extending from the point to the free ends. The anchor is molded so that the ribs naturally assume the deployed position, when no force is applied to the ribs. In the retracted position, shown in FIG. 4, which is attained by forcing the ribs radially in, the ribs 35 are close to the sleeve and the free ends 43 of the ribs are much closer to the sleeve than when in the deployed position. The anchor 31 resembles an umbrella without a canopy, to the extent that each have ribs that move radially in and out, with the ribs arranged around the circumference of a shaft. The ribs of the anchor move in response to a radially inward force, or the release of that force.

The extension member 33 is a stiff wire shaft with two ends. One end has an eye 45 formed therein. The eye can be open as shown in the drawings, or closed. An open eye allows the bait keeper to be retrofitted or installed onto hooks and the associated tackle. The other end 47 is made so as to allow coupling to the anchor. In the preferred embodiment, the other end 47 has a bent portion, which bent portion is almost 90 degrees to the wire shaft.

To assemble the bait keeper, the other end 47 of the extension member 33 is inserted into the sleeve 39 of the anchor 31 to the bottom of the cavity 41. The bent portion 47 bites into the plastic of the sleeve and resists the extension member 33 from being pulled out of the sleeve. Other coupling arrangements can be used such as a threaded coupling.

The lure 19 can be a soft plastic lure. Such a lure typically has a body 49 and may have one or more appendages 51 in the form of a tail (for a fish-like or worm-like lure), legs (for a lizard-like lure), claws (for a crawfish-like lure), etc. The soft plastic is such that hooks 15 can be easily inserted into the plastic (the hook is typically inserted into the body of the lure). As an example of a durometer, the lure may be Shore OO of 30. In contrast, the durometer of the anchor 31 is harder. While the lure is described herein as an artificial bait, the lure 19 could be a natural bait, such as a minnow, shad, or other bait fish. The lure could be live bait or dead bait.

To use, the eye 45 of the bait keeper 17 is installed onto the hook eye 21. Thus, the anchor 31 is free to move, or pivot, about the hook eye 21. The hook 15 is inserted into the lure in the desired manner. Different riggings use different hook sets. For example, the shank of the hook may be located outside of the lure, with the hook point located in the lure. Such an arrangement is considered to be "weedless" where the point of the hook will not snag or catch on weeds or underwater obstacles. As another example, the shank can be located in the lure, with the hook point exposed outside of the lure.

Generally, the lure 19 has a front end 53 that is located near the hook eye 21. The lure front end is located adjacent to the bait keeper 17. The anchor 31 is then pushed into the front end of the lure 19 (or the lure front end is pushed onto the bait keeper). The material of the lure forces the ribs 35 to retract into the retracted position. When the anchor 31 is fully inserted into the lure 19, the lure front end is moved away from the hook eye just a short distance. This slight reversal in direction allows the ribs 35 of the anchor to expand back to the deployed position. The anchor 31 is now fixed in the lure 19. The castable lure 11 can be fished.

The anchor 31 is particularly effective in retaining the front end of the lure 19 adjacent to the hook eye (or front portion of the hook). The lure material is located in, and wedged between, the space between the ribs 35 and the sleeve 39. The combination of the ribs and the sleeve provide a relatively large surface for contacting and resisting the lure material. However, in addition, the configuration of the ribs and sleeve provide a wedging arrangement that further increases the ability to hold the lure in place. The ribs 35 form a wedge with the sleeve 39. The ribs 35 also form a wedge with adjacent ribs 35. The ribs originate from a common point 37 and are splayed apart from one another. Thus, the space between two adjacent ribs looks like a "V", with the free ends 43 of the ribs further apart than the remainder of the ribs. These wedge configurations resist the anchor from being pulled out from the lure.

The bait keeper offers advantages to prior art bait keepers. Unlike helical type bait keepers, where the lure is twisted or rotated onto the helical coil, the bait keeper does not require any twisting to install. The lure is merely pushed on. This allows a lure to be quickly and easily rigged. Other prior art bait keepers use a stiff rod with circumferential barbs thereon. These bait keepers punch a large hole into the lure material during installation and weaken the plastic structure and holding ability of the bait keeper. Unlike the prior art, the ribs 35 of the bait keeper retract to make a smaller hole in the lure material. When deployed, the ribs penetrate into the plastic material, leaving plastic material between the ribs. This makes for a stronger attachment.

To change lures, the present lure is removed from the bait keeper. This requires the use of force to pull or disengage the bait keeper from the lure front end. The bait keeper is torn out from the lure front end. The lure is also removed from the hook. A different lure can be installed.

The foregoing disclosure and showings made in the drawings are merely illustrative of the principles of this invention and are not to be interpreted in a limiting sense.

The invention claimed is:

1. A fishing tackle bait keeper comprising:
   a) an anchor, the anchor consisting of a sleeve and plural barbless ribs, the sleeve having first and second ends, the first end being closed and having a tapered tip, the ribs coupled to the first end of the sleeve, the ribs arranged around a circumference of the sleeve and projecting in a diverging umbrella configuration arrangement from an end-most portion of the tapered tip in a direction opposite of the first end of the sleeve, the end-most portion being at a position furthest away from the second end, the ribs each having a free end;
   b) the ribs being flexible and capable of moving from a deployed position to a retracted position, wherein when the ribs are in the retracted position, the ribs are oriented with the sleeve to allow insertion of the bait keeper into a bait, and wherein when the ribs are in the deployed position, the ribs extend out from the sleeve to resist being removed from the bait, the ribs are normally in the deployed position;
   c) an extension member comprising a shaft, the shaft comprising a shaft first end and a shaft second end, frictionally coupled to an interior surface of the sleeve, the shaft second end having an attachment portion for coupling with an eye portion of a fishing hook, the eye portion being for attachment to a fishing line, wherein, when the attachment portion is attached to the eye portion, the bait keeper is pivotably suspended from the eye portion.

2. The fishing tackle bait keeper of claim 1, wherein each of the ribs diverges from adjacent ribs as the ribs extend from the first end of the sleeve.

3. The fishing tackle bait keeper of claim 2, wherein each of the ribs diverges from the sleeve as the ribs extend from the first end of the sleeve.

4. The fishing tackle bait keeper of claim 1, wherein each of the ribs diverges from the sleeve as the ribs extend from the first end of the sleeve.

5. The fishing tackle bait keeper of claim 1, wherein the sleeve and ribs are integrally formed such that the sleeve and ribs are a unitary piece.

6. The fishing tackle bait keeper of claim 1, wherein the ribs are arranged equidistant with respect to one another around the circumference of the sleeve.

7. The fishing tackle bait keeper of claim 6, the bait keeper having ten ribs spaced 36 degrees apart around the circumference of the sleeve.

8. A castable fishing lure, comprising:
 a) a hook having a point, a shank, and an eye;
 b) the eye being for attachment to a fishing line;
 c) a bait; with at least one of the point or shank located in the bait;
 d) a bait keeper comprising:
  i. an anchor, the anchor consisting of a sleeve and plural barbless ribs, the sleeve having first and second ends, the first end being closed and comprising a tapered tip, the ribs coupled to an end-most portion of the tapered tip of the first end of the sleeve, the end-most portion being at a position furthest away from the second end, the ribs arranged around a circumference of the sleeve and projecting in a diverging umbrella configuration arrangement from the first end of the sleeve in a direction opposite of the sleeve first end, the ribs each having a free end;
  ii. the ribs being flexible and capable of moving from the deployed position to a retracted position, wherein when the ribs are in the retracted position, the ribs are oriented with the sleeve to allow insertion of the bait keeper into the bait, and wherein when the ribs are in the deployed position, the ribs extend out from the sleeve to resist being removed from the bait, the ribs are normally in the deployed position;
  iii. an extension member comprising a shaft, the shaft comprising a shaft first end and a shaft second end, the shaft first end being frictionally coupled to an interior surface of the sleeve, the shaft second end having an attachment portion for coupling with the eye such that when the attachment portion is attached to the eye, the bait keeper is pivotably suspended from the eye;
 e) wherein the sleeve and ribs are integrally formed such that the sleeve and ribs are a unitary piece.

9. The castable fishing lure of claim 8, wherein each of the ribs diverges from adjacent ribs as the ribs extend from the first end of the sleeve.

10. The castable fishing lure of claim 9, wherein each of the ribs diverges from the sleeve as the ribs extend from the first end of the sleeve.

11. The castable fishing lure of claim 8, wherein each of the ribs diverges from the sleeve as the ribs extend from the first end of the sleeve.

12. The fishing tackle bait keeper of claim 8, the ribs being arranged equidistant with respect to one another around the circumference of the sleeve.

13. The fishing tackle bait keeper of claim 12, the ribs being spaced 36 degrees apart with respect to one another around the circumference of the sleeve.

* * * * *